US011120218B2

(12) United States Patent
Ray et al.

(10) Patent No.: US 11,120,218 B2
(45) Date of Patent: Sep. 14, 2021

(54) MATCHING BIAS AND RELEVANCY IN REVIEWS WITH ARTIFICIAL INTELLIGENCE (71) Applicant: International Business Machines Corporation, Armonk, NY (US)

(72) Inventors: Shubhadip Ray, Secaucus, NJ (US); Andrew S. Christiansen, Dubuque, IA (US); Craig M. Trim, Ventura, CA (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 16/439,960

(22) Filed: Jun. 13, 2019

(65) Prior Publication Data
US 2020/0394265 A1 Dec. 17, 2020

(51) Int. Cl.
*G06F 40/00* (2020.01)
*G06F 40/226* (2020.01)
*G06K 9/62* (2006.01)
*G06F 16/9536* (2019.01)
*G06N 3/02* (2006.01)
*G06F 40/295* (2020.01)

(52) U.S. Cl.
CPC ........ *G06F 40/226* (2020.01); *G06F 16/9536* (2019.01); *G06F 40/295* (2020.01); *G06K 9/6223* (2013.01); *G06K 9/6263* (2013.01); *G06N 3/02* (2013.01)

(58) Field of Classification Search
CPC ........ G06F 40/205; G06F 40/20; G06F 40/56; G06F 40/295; G06N 20/00; G06N 3/02; G10L 13/08; G10L 15/1815; G10L 25/63
See application file for complete search history.

(56) References Cited

U.S. PATENT DOCUMENTS 7,895,177 B2  2/2011  Wu
8,612,435 B2  12/2013  Sambrani et al.
(Continued)

FOREIGN PATENT DOCUMENTS

CN  102254038 A  11/2011
CN  102841942 A  12/2012
CN  104281665 A  1/2015

OTHER PUBLICATIONS

Roy, D. K., & Sharma, L. K. (2010). Genetic k-means clustering algorithm for mixed numeric and categorical data sets. International Journal of Artificial Intelligence & Applications, 1(2), 23-28. (Year: 2010).*

*Primary Examiner* — Edgar X Guerra-Erazo
(74) *Attorney, Agent, or Firm* — Yee & Associates, P.C.

(57) ABSTRACT

Matching bias and relevancy in online reviews is provided. A review from an internet media source is gathered and parsed to identify a number of entities with the review. A number of internet media posts are parsed to identify entities within the posts. Entities in the review are mapped to entities in the internet media posts. A bias and context are determined for the review. A bias and context are also determined for a user reading the review. A relevancy score of the review is determined by comparing the bias and context of the review to the bias and context of the user, and the review is displayed among a number of reviews according to its relevancy score for the user.

20 Claims, 6 Drawing Sheets

(56) References Cited

U.S. PATENT DOCUMENTS

| | | | |
|---|---|---|---|
| 9,283,476 B2* | 3/2016 | Mityagin | A63F 13/85 |
| 9,697,259 B1 | 7/2017 | Kim et al. | |
| 9,747,348 B2 | 8/2017 | Cama et al. | |
| 2007/0106663 A1 | 5/2007 | Rosenberg | |
| 2009/0054123 A1* | 2/2009 | Mityagin | G07F 17/3244 |
| | | | 463/9 |
| 2012/0197816 A1 | 8/2012 | Short et al. | |
| 2013/0138644 A1* | 5/2013 | Yahia | G06Q 50/01 |
| | | | 707/733 |
| 2013/0297581 A1 | 11/2013 | Ghosh et al. | |
| 2014/0114877 A1 | 4/2014 | Montano | |
| 2014/0379516 A1* | 12/2014 | Levi | G06Q 30/0631 |
| | | | 705/26.7 |
| 2016/0314507 A1 | 10/2016 | Tedjamulia et al. | |
| 2017/0169020 A9* | 6/2017 | Yahia | G06F 16/24578 |
| 2017/0235830 A1* | 8/2017 | Smith | G06F 40/30 |
| | | | 707/748 |
| 2018/0047071 A1* | 2/2018 | Hsu | G06Q 30/0282 |
| 2018/0210958 A1 | 7/2018 | Goyal et al. | |

* cited by examiner

MATCHING BIAS AND RELEVANCY IN REVIEWS WITH ARTIFICIAL INTELLIGENCE

BACKGROUND

The disclosure relates generally to reviews posted on the internet and more specifically to determining a bias and relevancy of a review and matching it to a bias and context of a user reading the review.

Informal word of mouth communications between parties has long been part of human behavior concerning the evaluation of goods and services. With the introduction of online reviews, word of mouth can now be systematically accessed in an organized way on a global scale without exclusive reliance on scattered reviews from a person's immediate social surroundings. Not only do retailers organize and provide reviews for customers and readers, third party online review websites allow users to provide and read reviews for a myriad of goods and services. However, online reviews are subject to bias.

The relevancy of online reviews for a reader varies with the bias and context of both the reviewer and the reader of the review. What is relevant for one reader might not be relevant for another. Online reviews might be motivated by factors other than quality of a given service or product and might not even be a result of an experience with a given service or product. Extraneous variables might exert a significant influence upon a reviewer as well as the reader.

SUMMARY

An illustrative embodiment provides a computer-implemented method for matching bias and relevancy in online reviews is provided. The method comprises gathering a review from an internet media source and parsing it to identify a number of entities with the review. A number of internet media posts are parsed to identify entities within the posts. Entities in the review are mapped to entities in the internet media posts. A bias and context are determined for the review. A bias and context are also determined for a user reading the review. A relevancy score of the review is determined by comparing the bias and context of the review to the bias and context of the user, and the review is displayed among a number of reviews according to its relevancy score for the user.

Another illustrative embodiment provides a system for bias matching. The system comprises a bus system; a storage device connected to the bus system, wherein the storage device stores program instructions; and a number of processors connected to the bus system, wherein the number of processors execute the program instructions to: gather a review from an internet media source; parse the review to identify a number of entities within the review; parse a number of internet media posts to identify entities within the posts; map entities in the review to entities in the internet media posts; determine a bias and context of the review; determine a bias and context for a user reading the review; determining a relevancy score of the review for the user by comparing the bias and context of the review to the bias and context of the user; and display the review among a number of reviews according to its relevancy score for the user.

Another illustrative embodiment provides a computer program product for bias matching. The computer program product comprises a non-volatile computer readable storage medium having program instructions embodied therewith, the program instructions executable by a number of processors to cause the computer to perform the steps of: gathering a review from an internet media source; parsing the review to identify a number of entities within the review; parsing a number of internet media posts to identify entities within the posts; mapping entities in the review to entities in the internet media posts; determining a bias and context of the review; determining a bias and context for a user reading the review; determining a relevancy score of the review for the user by comparing the bias and context of the review to the bias and context of the user; and displaying the review among a number of reviews according to its relevancy score for the user.

DETAILED DESCRIPTION

Illustrative embodiments recognize and take into account that the relevancy of online reviews varies with the context and viewpoint of both the reviewer and a reader of the review. Illustrative embodiments provide the technical solution of determining the relevance of reviews for specific readers of the reviews.

Illustrative embodiments recognize and take into account that online reviews might be motivated by factors other than quality of a given service or product and that extraneous factors might exert a significant influence upon a reviewer including a mistaken presumption on the part of the reviewer. The illustrative embodiments provide the technical solution of enriching reviews to store underlying context in which user has given the review and use it to match bias and context of the reviewer with that of a reader.

Illustrative embodiments also recognize and take into account that the relevance of a review for a specific reader might change for the reader under different circumstances. For example, a restaurant review might be relevant for a reader looking for a venue for an office party but might be irrelevant a week later when the same reader is looking for a venue for a birthday party. Therefore, illustrative embodiments provide the technical solution of matching the context of the review to the real-time context of the reader.

Illustrative embodiments also recognize and take into account that bias in reviews is a product of the point-of-view of the reader. Illustrative embodiments provide the technical solution of addressing the perception of bias by surfacing reviews written by reviewers with similar mindset and context as the reader. The readers can also manually adjust the match in mindset they would like in the reviews surfaced to them.

Illustrative embodiments provide a method of enriching the reviews written by a reviewer with additional context at the time of writing. This context can be mapped to the context of the user reading the reviews at the time of reading to surface the most relevant reviews. A review written by the same person may vary depending on the context.

By creating profiles of users and similar users, analyzing the mindset/predispositions/bias of users based on those profiles over a period of time and specifically at the time and context while providing the review, the illustrative embodiments determine the relevancy of a review and store the review with the entities, bias of the reviewer, and context. Illustrative embodiments merge events in news media with those predispositions/biases to offer deeper analysis of the context that motivated the reviewer while reviewing specific entities.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 1:
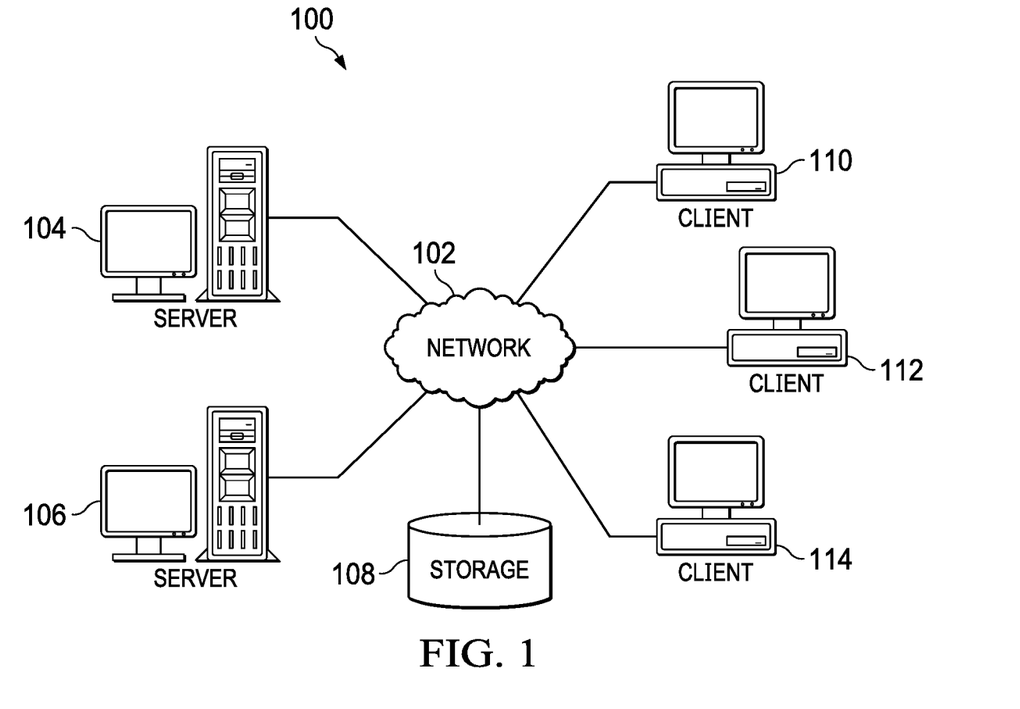
FIG. 1 depicts a pictorial representation of a network of data processing systems in which illustrative embodiments can be implemented.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage unit 108 may store other types of data, such as authentication or credential data that may include user names, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
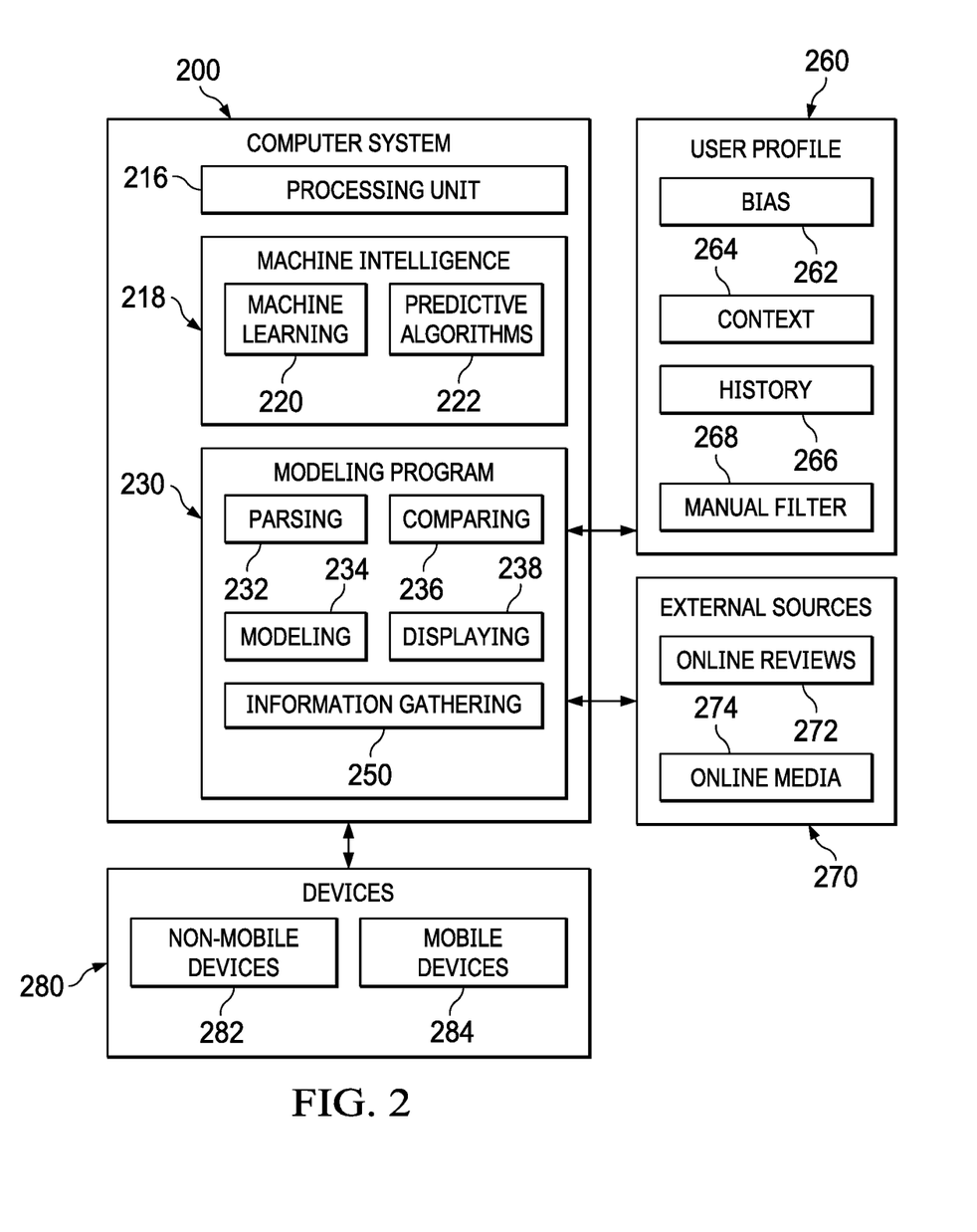
FIG. 2 illustrates a block diagram of system for matching bias and relevancy in a review in accordance with an illustrative embodiment.

FIG. 2 illustrates a block diagram of a system for matching bias and relevancy of reviews in accordance with an illustrative embodiment. Computer system 200 is connected to user profile 260, external sources 270, and devices 290. User profile 260 comprise bias/preference 262, context 264, history 266, and manual filter set by the user 268.

External sources 270 comprise online reviews 272, and online media sources 272. Devices 280 comprise non-mobile devices 282 and mobile devices 284. Computer system 200 comprises information processing unit 216, machine intelligence 218, and modeling program 230. Machine intelligence 218 comprises machine learning 220 and predictive algorithms 222.

Machine intelligence 218 can be implemented using one or more systems such as an artificial intelligence system, a neural network, a Bayesian network, an expert system, a fuzzy logic system, a genetic algorithm, or other suitable types of systems. Machine learning 220 and predictive algorithms 222 may make computer system 200 a special purpose computer for dynamic predictive modelling of bias and relevancy of online reviews.

In an embodiment, processing unit 216 comprises one or more conventional general purpose central processing units (CPUs). In an alternate embodiment, processing unit 216 comprises one or more graphical processing units (GPUs). Though originally designed to accelerate the creation of images with millions of pixels whose frames need to be continually recalculated to display output in less than a second, GPUs are particularly well suited to machine learning. Their specialized parallel processing architecture allows them to perform many more floating point operations per second then a CPU, on the order of 100× more. GPUs can be clustered together to run neural networks comprising hundreds of millions of connection nodes.

Modeling program 230 comprises information gathering 250, parsing 232, modeling 234, comparing 236, and displaying 238. Information gathering 252 is configured to gather data from personal profile 260 and external sources 270.

Thus, processing unit 216, machine intelligence 218, and modeling program 230 transform a computer system into a special purpose computer system as compared to currently available general computer systems that do not have a means to perform machine learning predictive modeling such as computer system 200 of FIG. 2. Currently used general computer systems do not have a means to accurately model bias and relevancy of online reviews according the bias and context of a user reading those reviews.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

Figure 3:
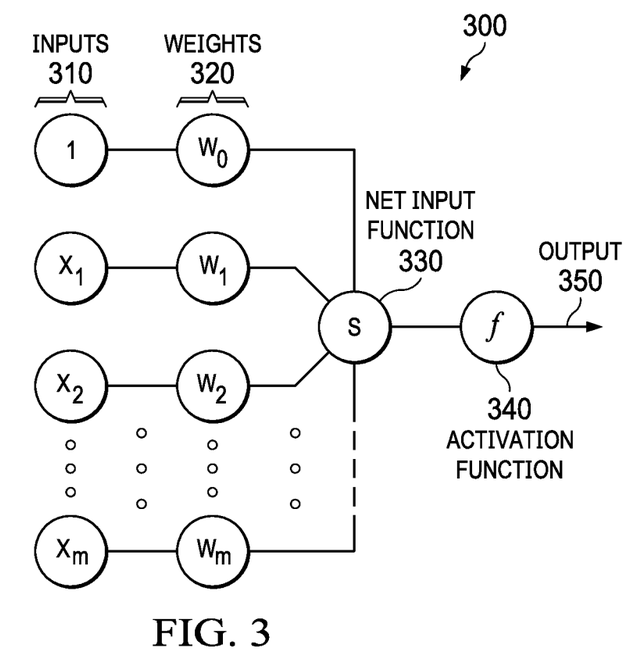
FIG. 3 is a diagram that illustrates a node in a neural network in which illustrative embodiments can be implemented.

FIG. 3 is a diagram that illustrates a node in a neural network in which illustrative embodiments can be implemented. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 4:
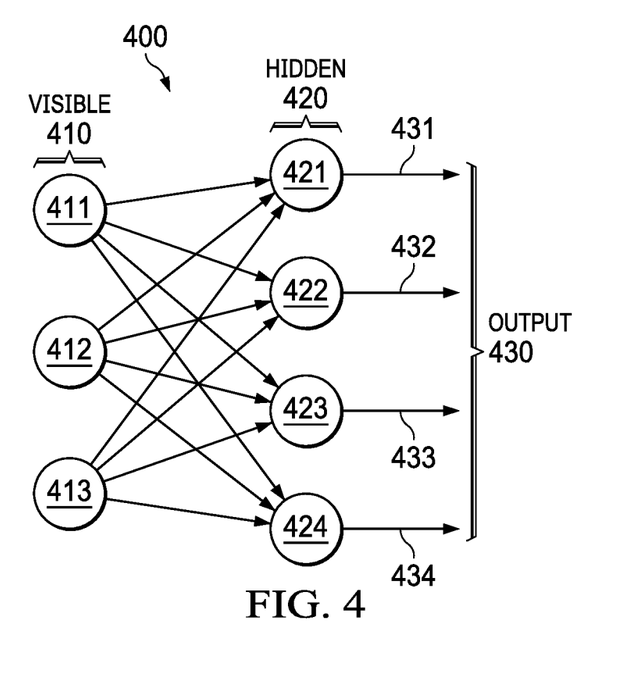
FIG. 4 is a diagram illustrating a neural network in which illustrative embodiments can be implemented.

FIG. 4 is a diagram illustrating a neural network in which illustrative embodiments can be implemented. As shown in FIG. 4, the nodes in the neural network 400 are divided into a layer of visible nodes 410 and a layer of hidden nodes 420. The visible nodes 410 are those that receive information from the environment (i.e. a set of external training data). Each visible node in layer 410 takes a low-level feature from an item in the dataset and passes it to the hidden nodes in the next layer 420. When a node in the hidden layer 420 receives an input value x from a visible node in layer 410 it multiplies x by the weight assigned to that connection (edge) and adds it to a bias b. The result of these two operations is then fed into an activation function which produces the node's output.

In symmetric networks, each node in one layer is connected to every node in the next layer. For example, when node 421 receives input from all of the visible nodes 411-413 each x value from the separate nodes is multiplied by its respective weight, and all of the products are summed. The summed products are then added to the hidden layer bias, and the result is passed through the activation function to produce output 431. A similar process is repeated at hidden nodes 422-424 to produce respective outputs 432-434. In the case of a deeper neural network, the outputs 430 of hidden layer 420 serve as inputs to the next hidden layer.

Training a neural network occurs in two alternating phases. The first phase is the "positive" phase in which the visible nodes' states are clamped to a particular binary state vector sampled from the training set (i.e. the network observes the training data). The second phase is the "negative" phase in which none of the nodes have their state determined by external data, and the network is allowed to run freely (i.e. the network tries to reconstruct the input). In the negative reconstruction phase the activations of the hidden layer 420 act as the inputs in a backward pass to visible layer 410. The activations are multiplied by the same weights that the visible layer inputs were on the forward pass. At each visible node 411-413 the sum of those products is added to a visible-layer bias. The output of those operations is a reconstruction r (i.e. an approximation of the original input x).

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks can be stacked to create deep networks. After training one neural net, the activities of its hidden nodes can be used as training data for a higher level, thereby allowing stacking of neural networks. Such stacking makes it possible to efficiently train several layers of hidden nodes. Examples of stacked networks include deep belief networks (DBN), deep Boltzmann machines (DBM), convolutional neural networks (CNN), recurrent neural networks (RNN), and spiking neural networks (SNN).

Figure 5:
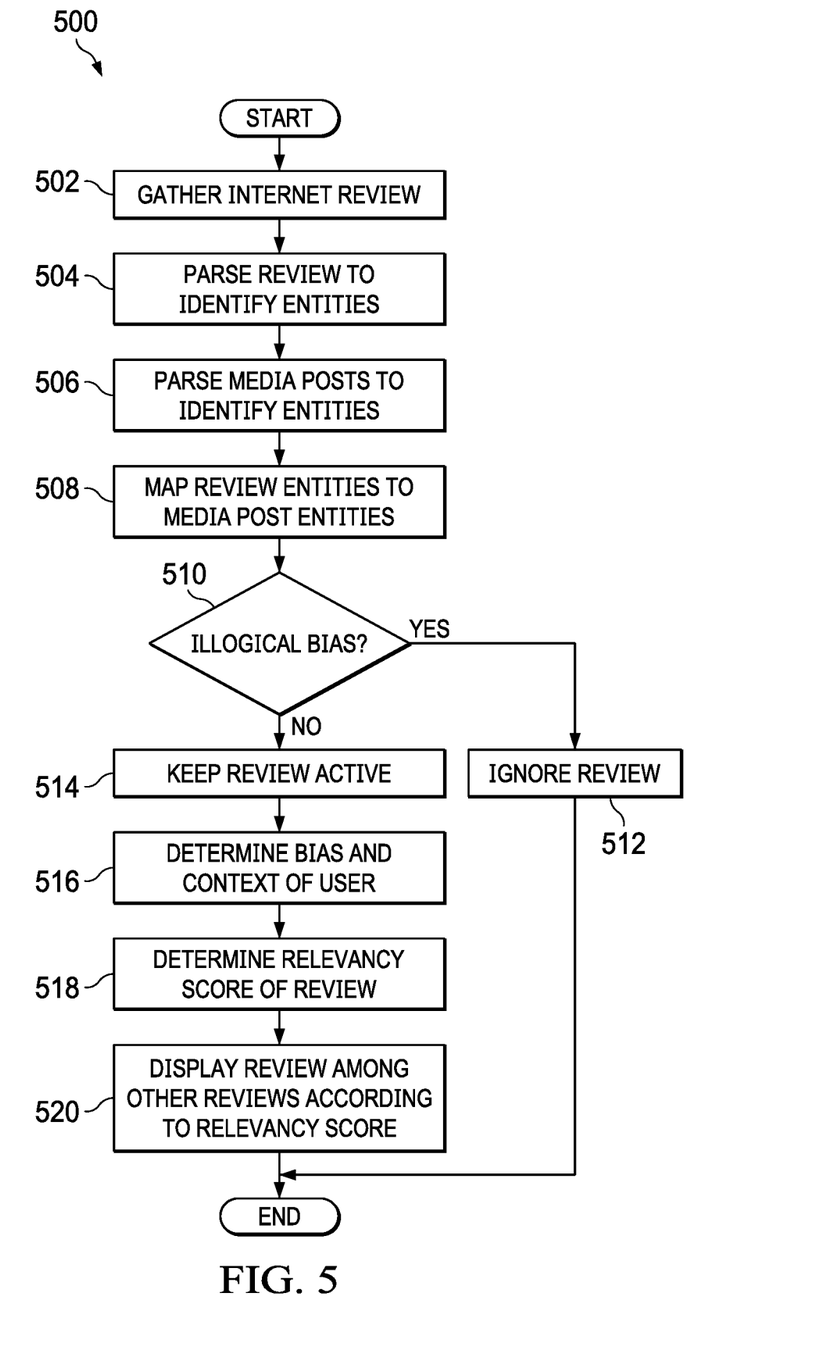
FIG. 5 is a process flow for determining bias and relevancy in reviews in accordance with an illustrative embodiment.

FIG. 5 is a process flow for determining bias and relevancy in reviews in accordance with an illustrative embodiment. Process 500 can be implemented in a neural network, such as neural network 400 in FIG. 4. Process 500 begins by gathering a review from an internet media source (step 502). The review is then parsed in to identify entities within the review (step 504). This parsing can be performed in real-time as soon as the review is submitted. Entities in the review are mapped to unique review IDs to derive a mindset/bias and context of the reviewer.

Process 500 parses internet media posts such as news stories to identify entities within the posts (step 506). The step can be performed using natural language processing (NLP) on news event posts, social media posts, and other online posts that are posted within a specified time frame proximal to the review. The NLP parsing can also identify historical news events and posts related to entities in the review. The news events can come from sources such as, e.g., online and printed formal news outlets or blogs, social medial feeds and posts, and other online media outlets. The event is mapped out based on, but not limited to, what happened, who caused the new event, protagonists and antagonists of the story, where it happened, and bias of the author, publishers, and storyline. Multiple news sources are searched on the same or similar data points to ensure that missed or misrepresented data is captured. Step 506 also analyzes historical trends of contribution of any author to identify if the author adopts different beliefs over a period of time or is biased from the outset.

Entities in the review are then mapped to the media posts (step 508). Discrete structured text, phrases derived from unstructured sources with associated metadata such as author, bias, type of bias, and data are stored in the context in the map instantiated in step 502.

From this mapping process 500 determines if the review has an illogical bias (step 510). Described in more detail in FIG. 6 below, this step determines if a review has been biased by the recent occurrence of a news event or historical trends in reporting of a topic. If there is an illogical bias in the review, the review is ignored (step 512), and process 500 ends for that review. If no illogical bias is detected, process 500 keeps the review active (step 514).

Process 500 then determines a bias and context for a user reading the review (step 516). This step can employ K-means clustering to determine rules for deriving bias and context of the user from similar users. The step involves determining the mindset and real-time context of the reader comprising factors related to entities of the review. For example, if the user is reading a restaurant the factors might include, without limitation, the type of restaurants the user visits, the food the user orders with respect to time of day, whether the user's food preferences have varied historically based, as well as which factors matter to the user such as value, ambience, health-consciousness, and the relative importance of these factors. Factors can be derived from patterns in mobile data and the footprint of the user related to, e.g., online, mobile, social media, data storage, past orders, posts, feedback, etc. The context of the user can include, without limitation, the time user is considering visiting the restaurant, any special events (e.g., party, wedding anniversary, work functions), and the type of people who might accompany the user (e.g., family, spouse, work colleagues, school friends, etc.).

A relevancy score of the review is determined by comparing the bias and context of the review to the bias and context of the user (step 518). This comparison can be made, e.g., by nodes in a layer of neural network 400, using approaches such as Euclidean distance between two vectors and other approaches for vector matching. The match score determines the relevancy of the review for the user reading the review. This method predicts bias and adjusts the relevancy of reviews by matching the mindset and context of the reviewer at the time of writing the review with the mindset and context of the user looking to make a decision based on the review. In an embodiment, the use reading the review can adjust the relevancy of reviews based on the user's preferences of weight on bias factor and context to see the reviews according to the user's preference. The adjustment can be made using a manual user filter such as filter 268 in FIG. 2.

The review is then displayed to the user among other reviews according to its relevancy score for the user (step 520). Machine learning can adjust the derivation of bias and context of similar users of reviews as well as weights on bias and context factors for different user clusters based on usage of the reviews and user feedback.

Figure 6:
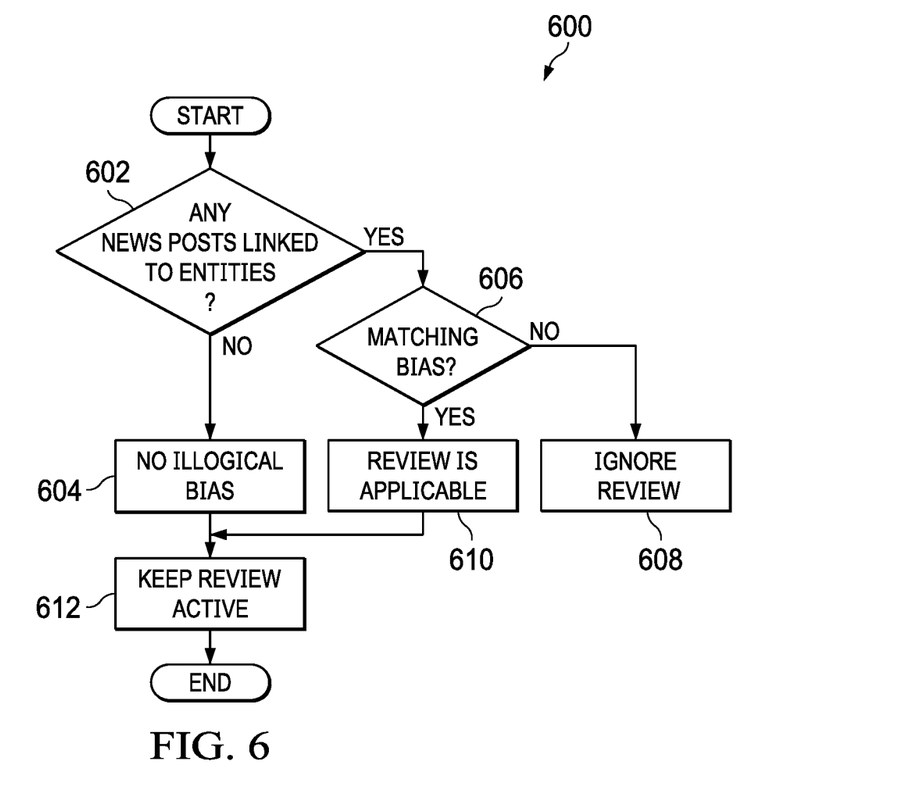
FIG. 6 is a process flow for determining illogical bias in a review in accordance with an illustrative embodiment.

FIG. 6 is a process flow for determining illogical bias in a review in accordance with an illustrative embodiment. Process 600 can be implemented in a neural network, such as neural network 400 in FIG. 4. Process 600 is a detailed description of step 510 in FIG. 5. Process 600 begins by searching the internet for internet news/media posts within a specific time frame of a review or historically can be linked to the entities in the review (step 602). If no news/media posts are found, process 600 determines that the review was not biased by any contemporary or historical news events and hence there is no illogical bias in the review (step 604). For example, if $BIAS_{R1}$ of review R1 is 0 on a scale of 0 to 1, such a score indicates no illogical bias.

If news/media posts are found related to entities in the review, the algorithm determines if a bias of the review matches a detectable bias in the news (step 606). Bias can be detected in media news stories, posts, reviews, etc., through the application of NLP and supervised machine learning with training data. A model can be considered to contain bias if it performs better for comments containing a particular entity term than for comments containing other entity terms. For example, the frequency of negative terms in a particular review (e.g., R1) on entity X can be compared to other reviews that are marked as negative in the training dataset for the same entity X. From this, $BIAS_{R1}$ of review R1 is calculated.

Similarly, the frequency of negative terms in a news story/post containing the same entity term X from the same specified time frame as review R1 can be compared to other new stories/posts in the training dataset marked as negative for the same entity item X. From this comparison, $BIAS_{N1}$ of news story N1 is determined with respect to entity X. With the above approach, bias scores (in reviews or news) will be between 0 and 1. The closer the score is to 0, the lower the bias. The closer it is to 1, the higher the bias.

In process 600, if $$BIAS_{R1} \neq \sum_{i}^{n} BIAS_{Ni}/n$$

where n is the total number of new stories/posts, and if $BIAS_{R1}$ is greater than a specified threshold T, R1 is considered mismatching/illogically biased and therefore ignored (step 608).

Conversely, if $$BIAS_{R1} \cong \sum_{i}^{n} BIAS_{Ni}/n$$

the bias of the review R1 does match the bias of the news. Process 600 therefore determines that the review is more accurate and is applicable (step 610).

If no illogical bias is detected in the review, or if the bias in the review matches the bias in the news/media posts, process 600 keeps the review as active for later consideration in step 514 of FIG. 5 (step 612).

As a general matter, self-motivated reviews exhibit a systematic negative bias in comparison to solicited reviews. Self-motivated reviews can also be influenced by the mere presence of other reviews and tend to display downward temporal trends. Hence self-motivated selection and social influence can bias. Solicited reviews tend to be more positive on average and display greater stability over time. Bias in new media stories/posts can be derived using NLP, comparing key normative words against entities found through parsing.

Figure 7:
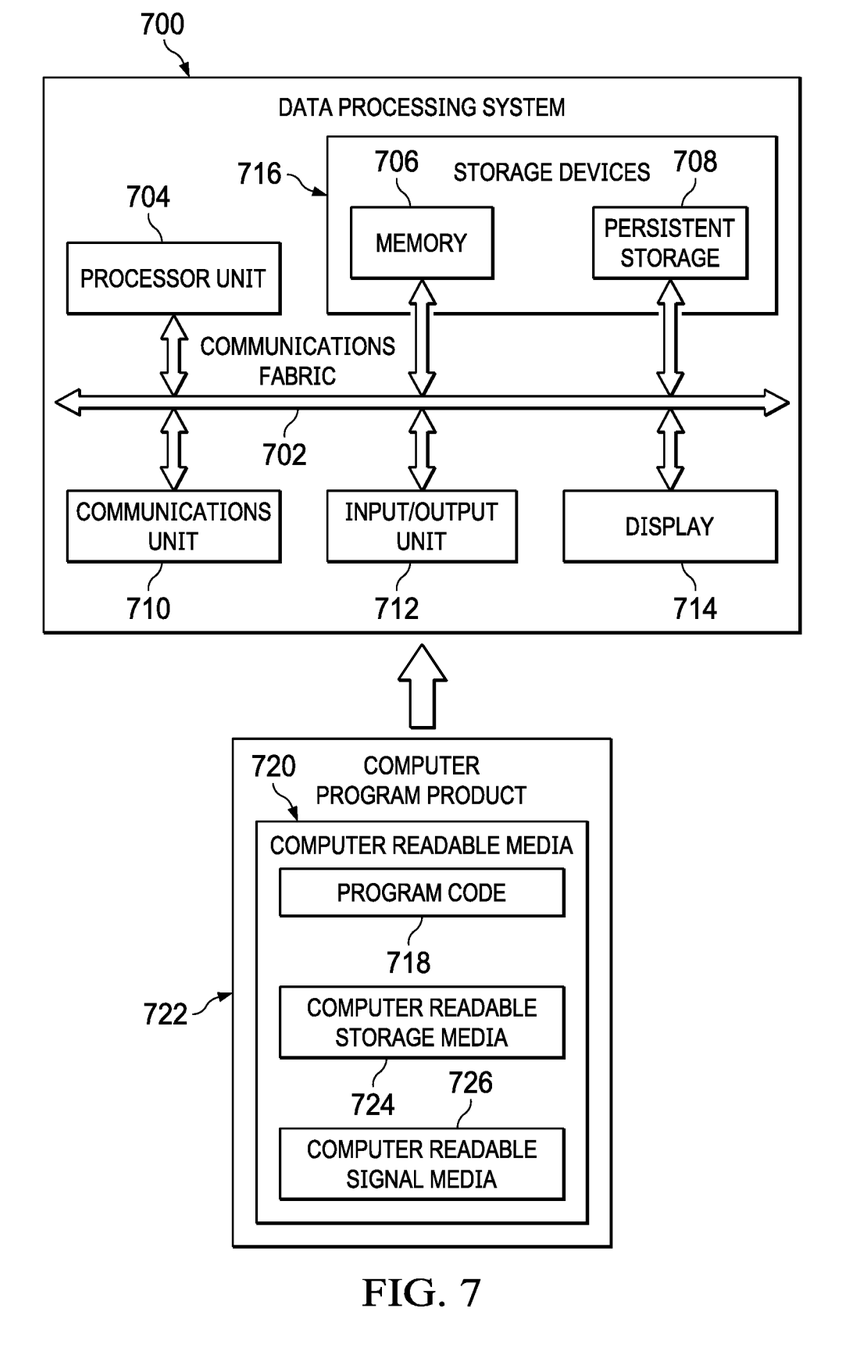
FIG. 7 is a diagram of a data processing system is depicted in accordance with an illustrative embodiment.

Turning to FIG. 7, a diagram of a data processing system is depicted in accordance with an illustrative embodiment. Data processing system 700 is an example of a system in which computer-readable program code or program instructions implementing processes of illustrative embodiments may be run. Data processing system 700 may be an example of one system in which root cause analysis system 116 in FIG. 1 may be implemented. In this illustrative example, data processing system 700 includes communications fabric 702, which provides communications between processor unit 704, memory 706, persistent storage 708, communications unit 710, input/output unit 712, and display 714.

Processor unit 704 serves to execute instructions for software applications and programs that may be loaded into memory 706. Processor unit 704 may be a set of one or more hardware processor devices or may be a multi-processor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 706, in these examples, may be, for example, a random access memory, or any other suitable volatile or non-volatile storage device. Persistent storage 708 may take various forms, depending on the particular implementation. For example, persistent storage 708 may contain one or more devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in this example, provides for communication with other computers, data processing systems, and devices via network communications unit 710 may provide communications using both physical and wireless communications links. The physical communications link may utilize, for example, a wire, cable, universal serial bus, or any other physical technology to establish a physical communications link for data processing system 700. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 700.

Input/output unit 712 allows for the input and output of data with other devices that may be connected to data processing system 700. For example, input/output unit 712 may provide a connection for user input through a keypad, keyboard, and/or some other suitable input device. Display 714 provides a mechanism to display information to a user and may include touch screen capabilities to allow the user to make on-screen selections through user interfaces or input data, for example.

Instructions for the operating system, applications, and/or programs may be located in storage devices 716, which are in communication with processor unit 704 through communications fabric 702. In this illustrative example, the instructions are in a functional form on persistent storage 708. These instructions may be loaded into memory 706 for running by processor unit 704. The processes of the different embodiments may be performed by processor unit 704 using computer-implemented program instructions, which may be located in a memory, such as memory 706. These program instructions are referred to as program code, computer-usable program code, or computer-readable program code that may be read and run by a processor in processor unit 704. The program code, in the different embodiments, may be embodied on different physical computer-readable storage devices, such as memory 706 or persistent storage 708.

Program code 718 is located in a functional form on computer-readable media 720 that is selectively removable and may be loaded onto or transferred to data processing system 700 for running by processor unit 704. Program code 718 and computer-readable media 720 form computer program product 722. In one example, computer-readable media 720 may be computer-readable storage media 724 or computer-readable signal media 726. Computer-readable storage media 724 may include, for example, an optical or magnetic disc that is inserted or placed into a drive or other device that is part of persistent storage 708 for transfer onto a storage device, such as a hard drive, that is part of persistent storage 708. Computer-readable storage media 724 also may take the form of a persistent storage, such as a hard drive, a thumb drive, or a flash memory that is connected to data processing system 700. In some instances, computer-readable storage media 724 may not be removable from data processing system 700.

Alternatively, program code 718 may be transferred to data processing system 700 using computer-readable signal media 726. Computer-readable signal media 726 may be, for example, a propagated data signal containing program code 718. For example, computer-readable signal media 726 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 718 may be downloaded over a network to persistent storage 708 from another device or data processing system through computer-readable signal media 726 for use within data processing system 700. For instance, program code stored in a computer-readable storage media in a data processing system may be downloaded over a network from the data processing system to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to, or in place of, those illustrated for data processing system 700. Other components shown in FIG. 7 can be varied from the illustrative examples shown. The different embodiments may be implemented using any hardware device or system capable of executing program code. As one example, data processing system 700 may include organic components integrated with inorganic components and/or may be comprised entirely of organic components excluding a human being. For example, a storage device may be comprised of an organic semiconductor.

As another example, a computer-readable storage device in data processing system 700 is any hardware apparatus that may store data. Memory 706, persistent storage 708, and computer-readable storage media 724 are examples of physical storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, it should be understood that embodiments discussed herein are not limited to the particular features and processing steps shown. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for bias matching, the method comprising:
    gathering, by a number of processors, a review from an internet media source;
    parsing, by a number of processors, the review to identify a number of entities within the review;
    parsing, by a number of processors, a number of internet media posts to identify entities within the posts;
    mapping, by a number of processors, entities in the review to entities in the internet media posts;
    determining, by a number of processors, a bias and context of the review, wherein:
        if no internet media posts within a specified time frame are mapped to entities in the review, there is no bias in the review;
        if a media post within a specified time frame has a bias that does not match a bias in the review, the review is ignored; and
        if a media post within a specified time frame has a bias that matches a bias in the review, the review is applicable;
    determining, by a number of processors, a bias and context for a user reading the review;
    determining, by a number of processors, a relevancy score of the review for the user by comparing the bias and context of the review to the bias and context of the user; and
    displaying, by a number of processors, the review among a number of reviews according to its relevancy score for the user.

2. The method of claim 1, further comprising adjusting weights on bias and context for users and clusters of users according to usage of reviews and feedback from users.

3. The method of claim 1, wherein the bias and context of the user is derived according to k-mean clustering.

4. The method of claim 1, wherein the user can manually adjust the relevancy score of the review according to user preference.

5. The method of claim 1, further comprising storing and analyzing metadata for a number of internet media posts of an author to determine historical trends of bias of the author.

6. The method of claim 1, wherein matching the bias and context of the review to the bias and context of the user comprises vector matching.

7. The method of claim 1, wherein the method is implemented in a neural network.

8. A computer program product for bias matching, the computer program product comprising:
    a non-volatile computer readable storage medium having program instructions embodied therewith, the program instructions executable by a number of processors to cause the computer to perform the steps of:
        gathering a review from an internet media source;
        parsing the review to identify a number of entities within the review;
        parsing a number of internet media posts to identify entities within the posts;
        mapping entities in the review to entities in the internet media posts;
        determining a bias and context of the review, wherein:
            if no internet media posts within a specified time frame are mapped to entities in the review, there is no bias in the review;

if a media post within a specified time frame has a bias that does not match a bias in the review, the review is ignored; and if a media post within a specified time frame has a bias that matches a bias in the review, the review is applicable;

determining a bias and context for a user reading the review;

determining a relevancy score of the review for the user by comparing the bias and context of the review to the bias and context of the user; and displaying the review among a number of reviews according to its relevancy score for the user.

9. The computer program product of claim 8, further comprising instructions to adjust weights on bias and context for users and clusters of users according to usage of reviews and feedback from users.

10. The computer program product of claim 8, wherein the bias and context of the user is derived according to k-mean clustering.

11. The computer program product of claim 8, wherein the user can manually adjust the relevancy score of the review according to user preference.

12. The computer program product of claim 8, further comprising instructions for storing and analyzing metadata for a number of internet media posts of an author to determine historical trends of bias of the author.

13. The computer program product of claim 8, wherein matching the bias and context of the review to the bias and context of the user comprises vector matching.

14. The computer program product of claim 8, wherein the number of processors execute the program instructions within a neural network.

15. A system for bias matching, the system comprising:
a bus system;
a storage device connected to the bus system, wherein the storage device stores program instructions; and
a number of processors connected to the bus system, wherein the number of processors execute the program instructions to:

gather a review from an internet media source;

parse the review to identify a number of entities within the review;

parse a number of internet media posts to identify entities within the posts;

map entities in the review to entities in the internet media posts;

determine a bias and context of the review, wherein:
if no internet media posts within a specified time frame are mapped to entities in the review, there is no bias in the review;

if a media post within a specified time frame has a bias that does not match a bias in the review, the review is ignored; and if a media post within a specified time frame has a bias that matches a bias in the review, the review is applicable;

determine a bias and context for a user reading the review;

determining a relevancy score of the review for the user by comparing the bias and context of the review to the bias and context of the user; and display the review among a number of reviews according to its relevancy score for the user.

16. The system according to claim 15, wherein the number of processors further execute instructions to adjust weights on bias and context for users and clusters of users according to usage of reviews and feedback from users.

17. The system according to claim 15, wherein the system further comprises a neural network.

18. The method of claim 1, wherein parsing the internet media posts to identify entities within the posts is performed with natural language processing.

19. The computer program product of claim 8, wherein parsing the internet media posts to identify entities within the posts is performed with natural language processing.

20. The system of claim 15, wherein parsing the internet media posts to identify entities within the posts is performed with natural language processing.

\* \* \* \* \*